(12) United States Patent
Mandal et al.

(10) Patent No.: US 6,746,794 B2
(45) Date of Patent: Jun. 8, 2004

(54) THERMAL RUNAWAY INHIBITORS

(75) Inventors: Braja K. Mandal, Darien, IL (US); Robert Filler, Skokie, IL (US)

(73) Assignee: Tech Drive, Inc, Chicago, IL (US)

( * ) Notice: Subject to any disclaimer, the term of this patent is extended or adjusted under 35 U.S.C. 154(b) by 310 days.

(21) Appl. No.: 09/879,633

(22) Filed: Jun. 12, 2001

(65) Prior Publication Data

US 2003/0003358 A1 Jan. 2, 2003

(51) Int. Cl.$^7$ .......................... H01M 10/40; H01M 10/50
(52) U.S. Cl. .......................... 429/62; 429/326
(58) Field of Search .......................... 252/62.2; 429/188, 429/324, 326, 62

(56) References Cited

U.S. PATENT DOCUMENTS

| | | |
|---|---|---|
| 3,876,654 A | 4/1975 | Pattison |
| 3,894,118 A | 7/1975 | Aronoff et al. |
| 3,909,484 A | 9/1975 | Beavon |
| 4,071,664 A | 1/1978 | Dey |
| 4,200,568 A | 4/1980 | Trautvetter et al. |
| 4,489,196 A | 12/1984 | Schmiegel |
| 4,496,682 A | 1/1985 | Schmiegel |
| 4,522,901 A | 6/1985 | Shacklette |
| 4,858,078 A | 8/1989 | Morimoto et al. |
| 4,774,011 A | 9/1989 | Mori et al. |
| 4,868,234 A | 9/1989 | Tabb et al. |
| 4,894,302 A | 1/1990 | Hoffman et al. |
| 5,061,581 A | 10/1991 | Narang et al. |
| 5,114,809 A | 5/1992 | Nakacho et al. |
| 5,151,462 A | 9/1992 | El-Hibri et al. |
| 5,214,370 A | 5/1993 | Harm et al. |
| 5,354,631 A | 10/1994 | Chaloner-Gill et al. |
| 5,376,478 A | 12/1994 | Nakacho et al. |
| 5,415,958 A | 5/1995 | Takahashi et al. |
| 5,418,091 A | 5/1995 | Gozdz et al. |
| 5,429,891 A | 7/1995 | Gozdz et al. |
| 5,455,127 A * | 10/1995 | Olsen et al. ................. 429/306 |
| 5,456,000 A | 10/1995 | Gozdz et al. |
| 5,460,905 A | 10/1995 | Gozdz |
| 5,468,571 A | 11/1995 | Fujimoto et al. |
| 5,567,546 A | 10/1996 | Maly-Schreiber et al. |
| 5,574,355 A | 11/1996 | McShane et al. |
| 5,580,684 A | 12/1996 | Yokoyama et al. |
| 5,623,195 A | 4/1997 | Bullock et al. |
| 5,639,574 A | 6/1997 | Hubbard et al. |
| 5,642,100 A | 6/1997 | Farmer |
| 5,739,234 A | 4/1998 | Kashio et al. |
| 5,830,600 A | 11/1998 | Narang et al. |
| 6,068,950 A * | 5/2000 | Gan et al. ................. 429/231.9 |
| 6,046,481 A | 6/2000 | Ishikura et al. |
| 6,077,624 A | 6/2000 | Mitchell et al. |
| 6,137,269 A | 10/2000 | Champlin |
| 6,210,840 B1 * | 4/2001 | Usami et al. ................. 429/325 |

FOREIGN PATENT DOCUMENTS

| | | |
|---|---|---|
| EP | 0141371 A1 | 5/1985 |
| EP | 0164254 A2 | 12/1985 |
| EP | 0141371 B1 | 8/1988 |
| EP | 0938151 A2 | 8/1999 |
| JP | 7192762 A2 | 7/1995 |

OTHER PUBLICATIONS

Mukaiyama, Teruaki; Obata, Teisuke; and Mitsunobu, Oyo; "Phosphorylation by the Use of Diethylphosphorosuccinimidate," *Bulletin of the Chemical Society of Japan*, vol. 38, No. 7, Jul. 1965, pp. 1091–1093.

(List continued on next page.)

*Primary Examiner*—Carol Chaney
(74) *Attorney, Agent, or Firm*—Wallenstein Wagner & Rockey, Ltd.; Stephen R. Auten

(57) ABSTRACT

The present invention provides for a battery having an anode, a cathode, and a flame-retarding electrolyte with a conductivity greater than about $10^{-3}$ S/cm at ambient temperature and which includes a compound that chemically interferes with flame propagation.

2 Claims, 5 Drawing Sheets

OTHER PUBLICATIONS

Brydson, J.A., *Plastics Materials*, 5$^{th}$ Ed., 1989, pp. 128–142.

Bindra, Ahshok, "New Self–Extinguishing Electrolytye Should Lead to Non–Flammable Lithium–Ion Battery," *Electronic Design*, vol. 46, No. 12, May 25, 1998, pp. 31.

Chang Woo Lee et al., "A Novel Flame–Retardant Additive for Lithium Batteries," (2) (2000), pp. 63–65, *Electrochemical and Solid–State Letters,* Chicago, IL, USA.

WU, C., "Stopping Batteries from Starting Fires," (Feb. 12, 2000), p. 103, *Science News*, vol. 157, USA.

Mandal, Braja K. et al., "New Class of Single–Ion–Conducting Solid Polymer Electrolytes Derived from Polyphenols," *Chemistry of Materials*, 12(1), pp. 6–8, (2000), Published on Web Dec. 15, 1999, USA.

Venkatachalapathy, Rajeev et al. "Thermal Investigations of Transitional Metal Oxide Cathodes in Li–ion Cells," *Electrochemistry Communications*, vol. 2, pp. 104–107, (2000).

Mehta, Mary Anne et al., "Transference Number Enhancement in Polymer Electrolytes by Incorporation of Anion Trapping Boroxine Rings into the Polymer Host," *Chemistry Letters* (Chemical Society of Japan), pp. 915–916 (1997).

Des Marteau, Darryl D., "Novel Perfluorinated Ionomes and Ioneners," *Journal of Fluorine Chemistry*, vol. pp. 203–208 (1995).

Razaq, M. et al., "Perfluorosulfonimide as an Additive in Phosphoric Acid Fuel Cell," *J. Electrochem. Soc.*, Vo. 136, No. 2, pp. 385–390, (Feb. 1989).

Moskva, V.V. et al. "Diethyl Formylphosphonate," translated from *Zhurnal Obshchei Khimii* vol. 57, No. 12, pp. 2793–2794, (Dec. 1987).

Mukaiyama, Teruaki et al., "Phosphorylation of Alcohols by the Use of Benzyldiethyl Phosphite and Monobromocyanoacetamide or N–Bromosuccinimide," *Bulletin of the Chemical Society of Japan*, vol. 38, No. 7, pp. 1088–1091 (Jul. 1965).

Brydson, J.A., *Plastics Materials*, 5$^{th}$ Ed. (1989) pp. 56–105, and 118–149.

TechDrive, Inc., "Novel Flame–Retardants for Self–Extinguishing Lithium–ion Battery Electrolytes: Phase II Final Report" submitted to the United States Department of Energy in Nov. 2002 pursuant to Grant No. DE–FG02–99ER82905.

* cited by examiner

THERMAL RUNAWAY INHIBITORS

REFERENCE TO GOVERNMENT GRANT

This invention was made with Government support under Instrument No. DE-FG02-99ER82905 awarded by the Department of Energy. The Government has certain rights in the invention.

TECHNICAL FIELD

The present invention relates to chemicals that inhibit thermal runaway in batteries, including flame-retarding electrolytes, as well as a method for preparing and using them.

BACKGROUND OF THE INVENTION

Batteries (often termed cells or electrochemical cells) are devices in which redox reactions occur at each of two electrodes separated by an ionically-conductive medium called an electrolyte, which can be either solid or liquid. During discharge, reduction occurs at the positive electrode (also called the cathode) and oxidation occurs at the negative electrode (known as the anode). Discharge is a spontaneous cell reaction where energy is released and can be used to supply power. During charging, voltage is supplied to the cell to store chemical energy at the electrodes. Primary batteries are those that cannot be recharged, i.e., used once and discarded. Secondary (commonly known as rechargeable) batteries involve chemically reversible reactions and can be recharged many times.

Lithium has the lowest redox potential of all metals, is very light-weight, and is non-toxic in oxidized form. For these reasons, lithium has been widely studied and utilized as an anodic material. Lithium rechargeable batteries that use liquid non-aqueous electrolytes are now under intensive research because they exhibit enhanced properties, such as high ionic conductivity, high output voltage and increased capacity.

Currently employed liquid non-aqueous electrolytes consist of two components: an organic solvent and a lithium ion source. A commonly used organic solvent is ethylene carbonate ("EC") because of its low cost, good electrochemical stability, and high dielectric constant, which facilitates the dissolution of the lithium ion source and contributes to high ionic conductivities. Other carbonates, such as dimethyl carbonate ("DMC") and propylene carbonate ("PC") are often used in conjunction with EC to reduce viscosity, as well as to increase the wettability of the electrolytic solution with battery components, e.g., separator and electrodes. The lithium ion source is generally a salt with $LiPF_6$ being a preferred salt because of its ease of dissolution (ca. 1 M) in carbonates and low cost compared to that of fluorinated salts, such as $CF_3SO_3Li$ and $(CF_3SO_2)_2NLi$. Liquid electrolytes comprised of a EC-DMC mixture (1:1) and $LiPF_6$ exhibit ionic conductivities greater than $10^{-3}$ S/cm at room temperature, a prerequisite for reliable operations of lithium-ion batteries.

Small lithium rechargeable batteries (also called lithium-ion batteries), which possess high energy density compared to other secondary batteries, are commercially available (with a capacity of 1300 to 1900 mAh) to power portable electronic devices such as cellular phones, camcorders, computers and cameras. Full size lithium-ion batteries are now under consideration for use in electric vehicles (EVs) to provide a longer driving range, higher acceleration, longer lifetime and a reduction in environmental pollution. Mass scale production of these batteries will be hampered until the safety-related issues, including controlling thermal runaway, are addressed.

For instance, under abusive conditions (e.g., shorting, crushing, or excessive over-charging) and occasionally under normal conditions (e.g., over-discharge, resistive and/or forced over-discharge), lithium-ion batteries that do not include safety features undergo thermal runaway. Thermal runaway is the condition where the rate of heat generation within a battery exceeds the battery's (and its operating environment's) capacity to dissipate the heat. This condition can cause accelerated dryout and increased charging current acceptance, which will eventually result in the battery igniting and/or exploding. In consumer oriented lithium-ion batteries, manufacturers employ external safety devices to minimize these potential hazards.

These devices include smart charge control (to avoid over-charge), a poly-thermal switch (to respond to a temperature rise in the battery), current path interrupter (to respond to a rise in internal pressure), and an aluminum rupture disk (as an over-pressure disconnect). These safety devices are expensive and are not cost effective for use in EVs, in which large volumes of liquid electrolytes are required.

Lithium rechargeable batteries also use another type of a non-aqueous electrolyte, a polymer-gel (often termed gel) electrolyte, in which comparatively less liquid electrolyte is used in a cross-linked polymer matrix. Because polymer-gel electrolyte requires less liquid, it reduces the magnitude of explosion or fire, but thermal runaway of the liquid electrolyte remains a critical concern. On the other hand, lithium rechargeable batteries containing a solid polymer electrolyte are comparatively safer, lighter in weight, more compact in size, and offer a more flexible design. Unfortunately, lithium polymer rechargeable batteries are not suitable for commercial production because of low ionic conductivities at room temperature. See e.g., Linden, D., Ed., Handbook of Batteries and Fuel Cells, McGraw-Hill, NY, 1995. Accordingly, there remains a need to provide safer electrolytes in batteries while maintaining high ionic conductivities. Such batteries require an electrolyte that inhibits, and preferably prohibits, thermal runaway and that is compatible with existing electrode and battery fabrication technology.

To improve the safety of these batteries, a number of approaches have been proposed. For example, Japanese Patent No. 7,192,762 discloses adding a halogenated formate ester to a nonaqueous electrolyte to decrease the flammability of the electrolyte. Further, European Application No. EP 0938151 discloses the use of a variety of fluorinated compounds in carbonate solvents to reduce the flammability of lithium battery electrolytes. U.S. Pat. No. 5,803,600 discloses the addition of certain compounds (e.g., phospholanes, cyclophosphazenes, silanes) to a variety of carbonates that generate $CO_2$ upon decomposition, thereby reducing the flammability of battery electrolytes. Unfortunately, the foregoing approaches require very large quantities (e.g., 20–80% by weight) of the flame-retarding additives to ensure proper operation. U.S. Pat. No. 6,077,624 discloses reducing thermal runaway in vinylidene fluoride copolymer-based electrochemical cells by decreasing the number of reactive sites of the copolymer, which is effectuated through cross-linking the copolymer in order to selectively dehydroflorinate the vinylidine flouride units in the copolymer.

However, one problem is that none of the foregoing references teach commercially lithium-ion batteries of sufficient size and safety to power a variety of mechanical or electrical devices such as an EV. None of the references teach inhibiting thermal runaway by using a chemical interference mechanism via free radical scavenging and/or fire damping through flame resistant coatings. A further problem is that prior thermal runaway inhibitors were required to be present at relatively high percentages (e.g., 20–80% by weight) in the electrolyte. The present invention is provided to solve these and other problems.

SUMMARY OF THE INVENTION

The present invention provides for a battery comprising an anode, a cathode, and a flame-retarding electrolyte having a conductivity greater than about $10^{-3}$ S/cm at ambient temperature and which includes a compound that chemically interferes with flame propagation. In one embodiment, the compound that chemically interferes with flame propagation is a free radical scavenger or a fire damping compound, or a combination thereof. The present invention also provides that the compound that comprises the thermal runaway inhibitor has the general chemical structure:

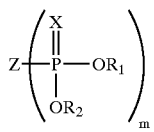

where X is either an oxygen atom or a sulfur atom, and $R_1$ and $R_2$ are independently selected from the group consisting of (a) $C_1$ to $C_{12}$ alkyl or haloalkyl moieties that may be terminally substituted, (b) $C_5$ to $C_7$ aryl moieties that are possibly substituted, and (c) trialkylsilyl moieties in which alkyl groups contain 1 to 6 carbon atoms.

The present invention further provides that Z is a moiety selected from the group consisting of aryl, aralkylene, dialkylamino, diarylamino, alkylarylamino, trialkyleneamino, cyclic amino, cyclic amido, cyclic imido, and oxy derivatives thereof, as well as tetraalkyleneoxysilane and alkylalkyleneoxysilane. Further, m is an integer 1 to 4.

In another embodiment, the compound that comprises the thermal runaway inhibitor has the general chemical structure:

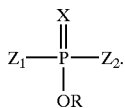

In this embodiment, X is an oxygen atom or a sulfur atom, and R is selected from the group consisting of moieties of (a) $C_1$ to $C_{12}$ alkyl or haloalkyl moieties that may be terminally substituted, (b) $C_5$ to $C_7$ aryl moieties that are possibly substituted, and (c) trialkylsilyl moieties in which alkyl groups contain 1 to 6 carbon atoms. The $Z_1$ and $Z_2$ moieties are each independently selected from the group consisting of aryl, aralkylene, dialkylamino, diarylamino, alkylarylamino, trialkyleneamino, cyclic amino, cyclic amido, cyclic imido, and oxy derivatives thereof.

The present invention also provides a method for synthesizing the compounds that comprise the thermal runaway inhibitors in a flame-retarding electrolyte, as well as exemplary apparatuses for employing the invention.

BRIEF DESCRIPTION OF THE DRAWINGS

FIG. 1(a) shows the standard electrolyte having no thermal runaway inhibitor; FIG. 1(b) is the standard electrolyte containing 1.6 wt. % of the thermal runaway inhibitor described in Example 1; FIG. 1(c) is the standard electrolyte containing 2.0 wt. % of the thermal runaway inhibitor described in Example 5.

FIG. 2(a) is of the standard electrolyte having no thermal runaway inhibitor; FIG. 2(b) is the standard electrolyte containing 1.6 wt. % of the thermal runaway inhibitor described in Example 1; FIG. 2(c) is the standard electrolyte containing 2.0 wt. % of the thermal runaway inhibitor described in Example 5.

FIG. 3(a) is the standard electrolyte having no thermal runaway inhibitor; FIG. 3(b) is the standard electrolyte containing 1.6 wt. % of the thermal runaway inhibitor described in Example 1; FIG. 3(c) is the standard electrolyte containing 2.0 wt. % of the thermal runaway inhibitor described in Example 5.

FIG. 4(a) is the standard electrolyte having no thermal runaway inhibitor; FIG. 4(b) is the standard electrolyte containing 1.6 wt. % of the thermal runaway inhibitor described in Example 1; FIG. 4(c) is the standard electrolyte containing 5.0 wt. % of the thermal runaway inhibitor described in Example 4.

FIG. 5(a) is the standard electrolyte containing 1.6 wt. % of the thermal runaway inhibitor described in Example 1; FIG. 5(b) is the standard electrolyte containing 5.0 wt. % of the thermal runaway inhibitor described in Example 4.

DETAILED DESCRIPTION

Figure 1:
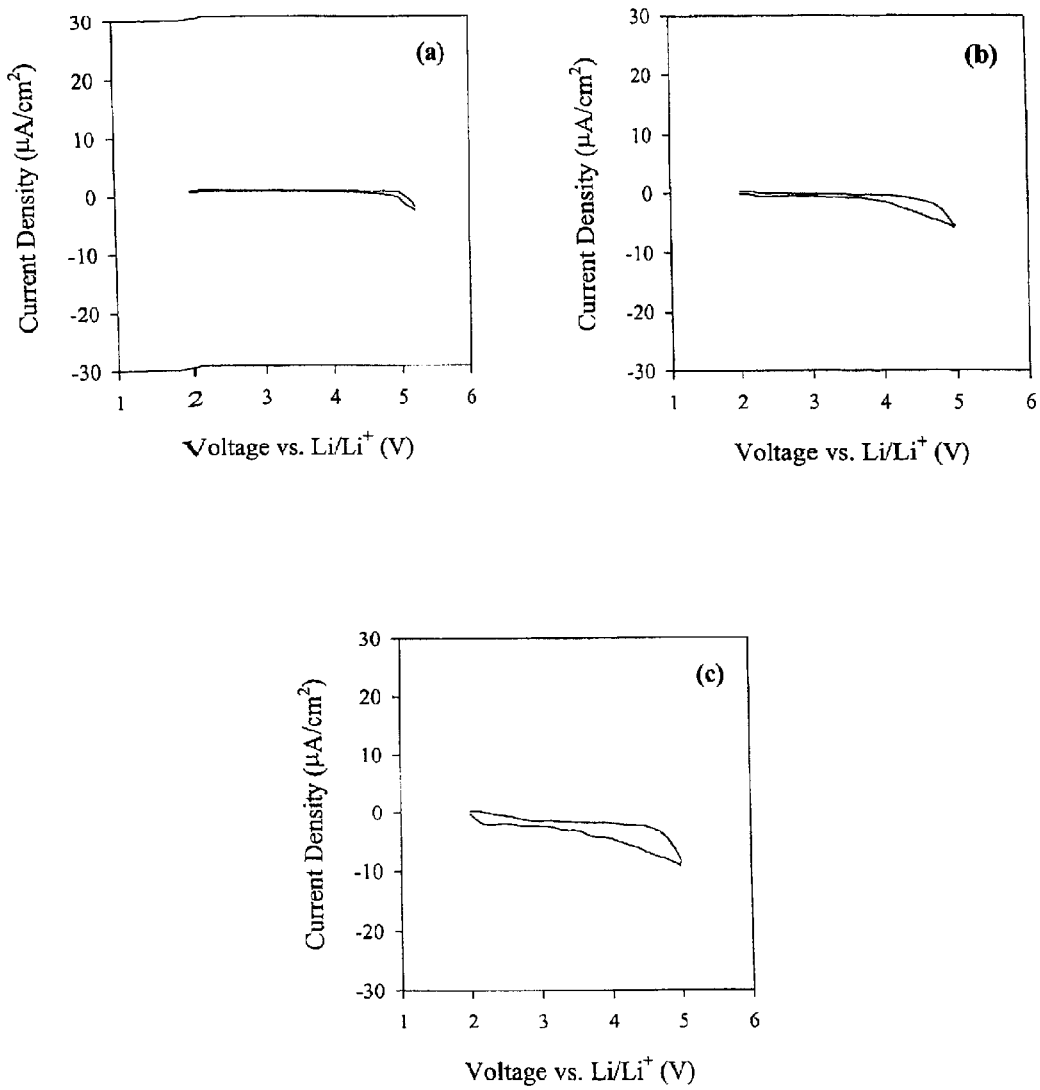
FIG. 1 shows the electrochemical stability of two thermal runaway inhibitors of the present invention in flame-retarding electrolytes as compared to a standard electrolyte. Specifically.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In the specification and claims that follow, reference will be made to the following terms, which shall be defined as follows:

The term "thermal runaway inhibitor" or "TRI" as used herein refers to a class of compounds that suppresses exothermic reactions that occur at high temperatures in the electrolyte mixture of an electrochemical cell by way of: chemical interference with flame propagation via free radical scavenging and/or fire damping, production of incombustible gases that dilute the available air supply, absorption of heat by endothermic decomposition or change of state, formation of impervious fire-resistant coatings, an unknown mechanism or any combination thereof. Therefore, TRI improves flame-retarding properties of the electrolytes by reducing the risk of fire or explosion caused by thermal runaway. Additionally, TRI is used to describe the exemplary compounds identified herein, as well as their equivalents.

The term "flame-retarding" indicates a reduction or elimination of the tendency of a combustible material to burn. Thus, a flame-retarding electrolyte composition is one in which the basic flammability has been reduced as measured by accelerated rate calorimetry. See e.g., Von Slacken et al., Proc. Seventh Int'l Meeting on Lithium Batteries, p. 12 (1994), or other standard tests for reduced flammability such as "Fire Retardants" in Encyclopedia of Polymer Science and Engineering, Vol 10, page 930–1022, $2^{nd}$ ed., John Wiley and Sons, N.Y. (1988). Further, the phrase "flame-retarding electrolyte" is used to describe an electrolyte comprising a flame-retarding compound or a TRI.

The term "alkyl" as used herein refers to a branched, unbranched or cyclic saturated hydrocarbon group of 1 to 12 carbon atoms, such as methyl, ethyl, n-propyl, isopropyl, n-butyl, isobutyl, t-butyl, octyl, decyl, dodecyl, cyclohexyl and the like. A "lower alkyl" group intends an alkyl group containing one to six, preferably one to four, carbon atoms.

The term "fluoroalkyl" as used herein refers to a branched, unbranched or cyclic saturated fluorocarbon group of 1 to 12 carbon atoms, such as trifluoromethyl, pentafluoroethyl and the like, as well as groups possessing both fluorocarbon and hydrocarbon segments. A "lower fluoroalkyl" group intends a fluoroalkyl group containing one to six, preferably one to four, carbon atoms.

The term "alkoxy" as used herein intends an alkyl group bound through a single, terminal ether linkage; that is, an "alkoxy" group may be defined as —OR wherein R is alkyl or fluoroalkyl as defined above. A "lower alkoxy" group intends an alkoxy group containing one to six, preferably one to four, carbon atoms.

The term "alkylene" is used to refer to moieties containing branched, unbranched or cyclic saturated hydrocarbon groups of 1 to 12 carbon atoms which have general structures —$(CH_2)_n$—, wherein n is an integer in the range of 1 to 12.

The term "aryl" (abbreviated "Ar") as used herein refers to a monocyclic aromatic species of about 5 to about 7 carbon atoms (e.g., phenyl) or a monocyclic aromatic species containing both carbon (2 to 5 atoms) and nitrogen (1 to 3 atoms) (e.g., pyridyl). Optionally, these groups are substituted with one to four lower alkyl, lower fluoroalkyl, lower alkoxy or combination thereof.

The term "aralkylene" is used to refer to moieties containing both alkylene and monocyclic aryl species, typically less than about 12 carbon atoms in the alkylene portion, and wherein the aryl substituent is bonded to the structure of interest through an alkylene linking group. Examples of aralkylene groups have structures —$(CH_2)_n$—Ar or —$(CH_2)_n$—Ar—$(CH_2)_n$—, wherein n is an integer in the range of 1 to 6.

The term "aryloxy" as used herein intends an aryl group bound through a single, terminal ether linkage.

The term "arylene" is used to refer to moieties containing a benzene, or heteroaromatic ring such as pyridine, pyrazine, and triazine, to which are appended two or more groups on different carbon atoms that form the ring (e.g., phenylene). Optionally, one or more lower alkyl, lower fluoroalkyl or lower alkoxy can be a part of the arylene residue.

The term "dialkylamino" refers to a moiety in which the nitrogen atom is covalently linked to two alkyl groups.

The term "diarylamino" refers to a moiety in which the nitrogen atom is covalently linked to two aryl groups.

The term "alkylarylamino" refers to a moiety in which the nitrogen atom is covalently linked to one alkyl group and one aryl group.

The term "alkyleneamino" refers to a moiety in which the nitrogen atom is covalently linked to three alkylene groups.

The term "cyclic amino" refers to a moiety having from about 5 to about 6 atoms arranged in a ring, which may or may not be substituted and which may or may not be saturated, and having at least one isolated nitrogen atom in the ring.

The term "cyclic amido" refers to a moiety having from about 5 to about 6 atoms arranged in a ring, which may or may not be substituted and which may or may not be saturated, and having at least one isolated pair of one nitrogen atom and one carbonyl group in the ring.

The term "cyclic imido" refers to a moiety having from about 5 to about 6 atoms arranged in a ring, which may or may not be substituted and which may or may not be saturated, and having at least one isolated functional group in which the nitrogen atom is flanked in the ring by at least one carbonyl group on each side of the nitrogen atom.

The term "tetraalkyleneoxysilane" refers to a moiety in which four alkylene groups are connected to a silicon atom via oxygen linkages.

The term "alkylalkyleneoxysilane" refers to a moiety in which one of the four bonds of silicon is connected to an alkyl group and at least one of the remaining three bonds of silicon is connected to an alkylene group via an oxygen bond, and the remaining two bonds of silicon can be satisfied by their combination thereof.

The practice of the present invention will employ, unless otherwise indicated, conventional techniques of synthetic organic chemistry, electrochemistry, and polymer chemistry that are within the skill of the art. Such techniques are explained fully in the literature. See e.g., Kirk-Otluner's *Encyclopedia of Chemical Technology*, Wade's *Organic Chemistry* (1999), Ege's *Organic Chemistry: Structure and Reactivity* (1994), March's *Advanced Organic Chemistry* (1992), Carey and Sundberg's *Advanced Organic Chemistry* (1990), or similar sources in the chemical literature.

The present invention provides for a battery comprising an anode and a cathode. The anode is an electrode where oxidation occurs and is comprised of carbonaceous materials, more preferably carbon black, active carbon, glassy carbon, or carbon fiber, and most preferably graphite. The cathode is another electrode where reduction occurs and is comprised of lithium transition metal oxide complexes, more preferably $LiCoO_2$ or $LiNiO_2$, and most preferably $LiMn_2O_4$. The anode and cathode can also be of any kind known to one of ordinary skill in the art.

The present invention further provides for the battery to comprise an electrolyte having conductivity greater than about $10^{-3}$ S/cm at ambient temperature and which includes a compound that chemically interferes with flame propagation. The phrase "chemically interferes with flame propagation" is defined in one application as a chemical reaction in which an organic free radical reacts with and neutralizes other radicals, such as oxygen, which are required to sustain propagation of a flame. A second application of chemical interference with flame propagation involves fire damping by formation of a material that serves as a blanket to extinguish the fire. Thus, "chemically interferes with flame propagation" is a mechanism that comprises free radical scavenging and fire damping, and it is at least one of the mechanisms by which the compound is flame-retarding. The compound may comprise other mechanisms, including those heretofore described or a combination thereof. Preferably, the compound that chemically interferes with flame propagation is a radical scavenger.

The present invention also provides that the compound that comprises the thermal runaway inhibitor has the general structure:

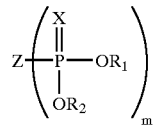

According to the invention, X is either an oxygen or a sulfur atom, preferably oxygen. Additionally, $R_1$ and $R_2$ are each independently selected from the group consisting of (a) $C_1$ to $C_{12}$ alkyl moieties that are terminally substituted with zero to three halogen atoms, preferably fluorine; (b) $C_5$ to $C_7$ aryl moieties substituted with zero to four alkyl, haloalkyl (preferably fluorine), or alkoxy moieties; and (c) trialkylsilyl moieties in which alkyl groups contain 1 to 6 carbon atoms, preferably methyl groups. The $R_1$ and $R_2$ moieties may be the same or different. Preferably, both $R_1$ and $R_2$ are ethyl groups.

The present invention further provides that Z is a moiety selected from the group consisting of aryl, aralkylene, dialkylamino, diarylamino, alkylarylamino, trialkyleneamino, cyclic amino, cyclic amido, cyclic imido, and oxy derivatives thereof. What is meant by oxy derivative in this instance is that the Z moiety is bound to the phosphorus atom through a single oxygen atom. Further, Z can also be a trialkylalkyleneoxysilane moiety.

The present invention provides that Z may be an aryloxy moiety as defined above. One example of an aryloxy group is a phenyl-containing moiety, specifically phenoxy, and more specifically 2,6-di-tert-butyl-4-methylphenoxy. A possible oxy derivative of an aryl would be, but is not limited to, a moiety derived from substituted or unsubstituted phenol. Accordingly, the present invention provides that two possible examples of a compound that interferes with flame propagation are diethyl(2,6-di-tert-butyl-4-methylphenyl)phosphate and diethylphenylthiophosphate. The present invention also contemplates that Z may be a moiety of an aryl, arylene, or aralkylene group. Examples of suitable aryl moieties include phenyl; 4-methylphenyl; 2,6-di-tert-butyl-4-methylphenyl; 2-tert-butyl-4-methoxyphenyl; 3-tert-butyl-4-methoxyphenyl, and 3-pyridyl. Suitable aralkylene moieties are 4-methylbenzyl, 4-methoxybenzyl, and the like. Suitable arylene moieties are phenylene, pyridylene, and the like. Suitable aralkylene moieties are 1,4-dimethylbenzene and the like.

As stated above, the present invention also provides that Z may be a cyclic imido moiety, which may be selected from the group consisting of succinimidyl and glutarimidyl, though other cyclic imido moieties are possible provided that the resulting compound chemically interferes with flame propagation or is flame-retarding through another mechanism. Non-limiting examples of the present invention comprising a cyclic imido moiety are diethylphosphorosuccinimidate and diethyl-N-succinimidylphosphate. The latter example is an instance where Z is bound to the phosphorus atom with an oxy linkage, namely an oxy derivative of a succinimidyl referred to as O-succinimidyl.

The present invention also provides that Z may be a moiety of a diarylamino group, suitable examples of which include diphenylamino and bis(4-methylphenyl)amino. When the diphenylamino group is selected as Z, a possible resulting compound is a diethylphosphorodiphenylamidate. Of course, the actual identity of the compound in an example given herein will depend on the chosen identities of X, $R_1$, $R_2$, and Z. The present invention contemplates that the $R_1$, $R_2$, and Z moieties may contain substituents. Suitable substituents include but are not limited to: alkyl, haloalkyl (preferably fluoroalkyl), alkoxy, halogens, aryl, and any combination thereof. The present invention also contemplates that both aryl groups of Z may be replaced with alkyl groups, resulting in Z comprising a dialkylamino moiety such as dimethylamino or diethylamino. Of course, if only one aryl group of Z is replaced, Z then comprises an alkylarylamino moiety such as methylphenylamino or ethylphenylamino).

The present invention further provides that Z may be a cyclic amino moiety selected from the group consisting of pyridino, piperidino, pyrrolidino, and piperazino. A specific example of where Z is a cyclic amino moiety is the compound diethyl-3-pyridylphosphate, though other examples are certainly possible through the substitution of a different cyclic amino moiety. The present invention further provides that Z may be a cyclic amido moiety. Suitable examples include, but are not limited to, 2-imidazolidinonyl, 2-pyrrolidinono, and 2-piperidinono.

The present invention further provides that "m" is an integer from 1 to 4. In each of the foregoing examples, m was equal to 1. However, the present invention contemplates that when m is greater than 1, it is possible to link together two functional groups at Z, which may be a moiety selected from cyclic amino, cyclic amido, cyclic imido, alkylenes, arylenes, aralkylenes, urea, and the oxy derivatives thereof. What is meant by oxy derivative in this instance is that the common Z linkage is bound to each of the two functional groups through a single oxygen atom. Accordingly, when m=2, the general structure of the compound that comprises the TRI may be represented as:

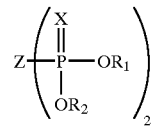

where X is either an oxygen atom or a sulfur atom, preferably oxygen. Additionally, $R_1$ and $R_2$ are each independently selected from the group consisting of (a) $C_1$ to $C_{12}$ alkyl moieties that are terminally substituted with zero to three halogen atoms, preferably fluorine atoms; (b) $C_5$ to $C_7$ aryl moieties substituted with zero to four alkyl, haloalkyl (preferably fluoroalkyl), or alkoxy moieties; and (c) trialkylsilyl moieties in which alkyl groups contain 1 to 6 carbon atoms, preferably methyl groups. The $R_1$ and $R_2$ moieties may be the same or different. Preferably, both $R_1$ and $R_2$ are ethyl groups. The present invention further provides that when m=2, Z is a moiety selected from the group consisting of arylene, aralkylene, cyclic amino, cyclic amido, cyclic imido, urea, cyclic urea, and oxy derivatives thereof. What is meant by oxy derivative in this instance is that the Z moiety is bound to the phosphorus atom through a single oxygen atom. In this embodiment, the Z moiety can also be a dialkyldialkyleneoxysilane moiety.

Still yet another example is where Z is an arylene moiety, specifically a phenylene moiety, and more specifically a 1,4-phenylene moiety, and where each R is an ethyl group, resulting in the compound 1,4-bis(diethylphosphoro)benzene. The present invention provides that Z could be a dialkyldialkyleneoxysilane moiety, more specifically a dimethyl-di-methyleneoxysilane moiety, and where each R is an ethyl group, resulting in dimethyl-bis(diethylmethylphosphonatoxy)silane.

When m=2, the general structure of the compound that comprises the TRI may also be represented as:

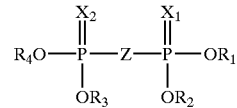

where $X_1$ and $X_2$ are each selected from the group consisting of sulfur and oxygen; Z is defined above; and $R_1$ through $R_4$ are each independently selected from the group consisting of (a) $C_1$ to $C_{12}$ alkyl moieties that are terminally substituted with zero to three halogen (preferably fluorine) atoms; (b) $C_5$ to $C_7$ aryl moieties substituted with zero to four alkyl, haloalkyl (preferably fluoroalkyl), or alkoxy moieties; and (c) trialkylsilyl moieties in which alkyl groups contain 1 to 6 carbon atoms, preferably methyl groups. Additionally, $R_1$ through $R_4$ may be the same moiety or each may be different.

In one preferred embodiment, Z is a dioxy derivative of benzene, more specifically an incipient residue of hydroquinone, and where each R is an ethyl group, resulting in the compound benzene-1,4-bis-diethylphosphate. Still yet another example is where Z is a cyclic urea, more specifically a 2-imidazolidinonyl group, and where each R is an ethyl group, resulting in the compound N,N'-bis (diethylphosphoro)imidazolidone. The present invention contemplates that Z could also be an open-chain dialkyl urea, diarylurea, or an alkylarylurea moiety.

As disclosed above, it is possible to link together three functional groups at Z, wherein Z may be a moiety selected from arylenes, trialkyleneamino, cyclic aminos, and the oxy derivatives thereof. What is meant by oxy derivative in this instance is that the common Z linkage is bound to each of the three functional groups through a single oxygen atom. Accordingly, when m=3, the general structure of the compound that comprises TRI may be represented as:

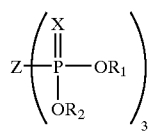

As with the above-described embodiments, X is either an oxygen atom or a sulfur atom, preferably oxygen. Additionally, $R_1$ and $R_2$ are each independently selected from the group consisting of (a) $C_1$ to $C_{12}$ alkyl moieties that are terminally substituted with zero to three halogen (preferably fluorine) atoms, (b) $C_5$ to $C_7$ aryl moieties substituted with zero to four alkyl, haloalkyl (preferably fluoroalkyl), or alkoxy moieties, and (c) trialkylsilyl moieties in which alkyl groups contain 1 to 6 carbon atoms, preferably methyl groups. The $R_1$ and $R_2$ moieties may be the same or different. Preferably, both $R_1$ and $R_2$ are ethyl groups. The present invention further provides that when m=3, Z is a moiety selected from the group consisting of arylenes, trialkyleneamino, cyclic amino, and oxy derivatives thereof. What is meant by oxy derivative in this instance is that the Z moiety is bound to the phosphorus atom through a single oxygen atom. Further, Z can also be an alkyltrialkyleneoxysilane moiety.

The present invention also contemplates that the general structure of TRI may be represented as:

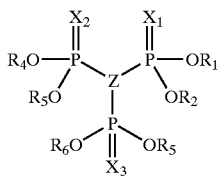

where $X_1$, $X_2$ and $X_3$ each selected from the group consisting of sulfur and oxygen; Z is defined above; and $R_1$ through $R_6$ are each independently selected from the group consisting of (a) $C_1$ to $C_{12}$ alkyl moieties that are terminally substituted with zero to three halogen (preferably fluorine) atoms, (b) $C_5$ to $C_7$ aryl moieties substituted with zero to four alkyl, haloalkyl (preferably fluoroalkyl), or alkoxy moieties, and (c) trialkylsilyl moieties in which alkyl groups contain 1 to 6 carbon atoms, preferably me thyl groups. Additionally, $R_1$ through $R_6$ may be the same moiety or each may be different.

In one preferred embodiment, Z is an oxy derivative of a trialkyleneamino group, more specifically an oxy derivative of triethyleneamino, and where each R is an ethyl group, resulting in the compound triethanolamino-tris-diethylphosphate.

This embodiment contemplates that Z may comprise any aryl, arylene or aralkylene moiety described in the above embodiments and may further comprise trisubstituted benzene, trisubstituted pyridine, or trisubstituted triazine, and the like. Suitable aralkylenes include 1,3,5-trimethylenebenzene. Suitable trialkyleneamino moieties include trimethyleneamino, triethyleneamino, and the like. As stated above, the present invention contemplates the oxy derivatives of what may comprise the Z moiety, including but not limited to, trioxymethyleneamino, trioxyethyleneamino, and the like.

Another contemplated embodiment is where Z is linked to four functional groups, resulting in the compound that comprises the TRI having the general chemical structure:

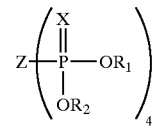

where X is either an oxygen atom or a sulfur atom, preferably oxygen. When m=4, the present invention contemplates that there exists four separate X moieties (X, through $X_4$) where each X is either oxygen or sulfur. Additionally, $R_1$ and $R_2$ are each independently selected from the group consisting of (a) $C_1$ to $C_{12}$ alkyl moieties that are terminally substituted with zero to three halogen (preferably fluorine) atoms, (b) $C_5$ to $C_7$ aryl moieties substituted with zero to four alkyl, haloalkyl (preferably fluoroalkyl), or alkoxy moieties, and (c) trialkylsilyl moieties in which alkyl groups contain 1 to 6 carbon atoms, preferably methyl groups. The present invention also contemplates that when m=4, there exists eight separate R moieties, which are each independently selected in the same manner as $R_1$ and $R_2$, as is disclosed above. $R_1$ through $R_8$ may be the same or different. Preferably, each R is an ethyl group. The present invention further provides that when m=4, Z is a moiety selected from the group consisting of arylenes, and oxy derivatives thereof. What is meant by oxy derivative in this instance is that the Z moiety is bound to the phosphorus atom through a single oxygen atom. Further Z, can also be a tetraalkyleneoxysilane moiety, a suitable example of which is tetramethyleneoxysilane.

In yet another embodiment, the present invention provides for the compound that comprises the TRI having the general structure:

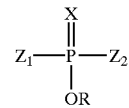

As with the above-described embodiments, X is an oxygen atom or a sulfur, preferably oxygen. The R moiety is again selected from the group consisting of (a) $C_1$ to $C_{12}$ alkyl terminally substituted with zero to three halogen (preferably fluorine) atoms; (b) $C_5$ to $C_7$ aryl moieties substituted with zero to four alkyl, haloalkyl (preferably fluoroalkyl), or alkoxy moieties; and trialkylsilyl moieties in which alkyl groups contain 1 to 6 carbon atoms, preferably methyl groups. In this embodiment, $Z_1$ and $Z_2$ are each independently selected from the group consisting of aryl, aralkylene, dialkylamino, diarylamino, alkylarylamino, trialkyleneamino, cyclic amino, cyclic amido, cyclic imido, and oxy derivatives thereof. What is meant by oxy derivative in this instance is that the $Z_1$ or $Z_2$ moiety is bound to the phosphorus atom through a single oxygen atom. Further $Z_1$ or $Z_2$ can also be a trialkylalkyleneoxysilane moiety. The $Z_1$ moiety may be the same or different as the $Z_2$ moiety in the compound. In this instance, the oxy derivative is where $Z_1$ or $Z_2$, or both, are bound to the phosphorus atom through a respective oxygen atom. Accordingly, in one particular embodiment where $Z_1$ and $Z_2$ are both succinimidyl groups, and where R is ethyl group, the resulting compound is ethylphosphorodi-N-succinimidate.

The present invention also provides for a method for synthesizing the compounds that comprise the thermal runaway inhibitors. Although described at this juncture, a more detailed description follows in the experimental disclosure. The first step of the method comprises providing a first starting material selected from the group consisting of 2,6-di-tert-butyl-4-methylphenol; phenol; triethanolamine; N-hydroxysuccinimide; 2-imidazolidone; 3-hydroxypyridine; diphenylamine, and succinimide.

The next step of the method is mixing the starting material with a sufficient amount of an organic solvent in which the starting material is essentially soluble to form a solution. In one preferred embodiment, the organic solvent is tetrahydrofuran (THF), and is preferably dried before use. It should be noted that any organic solvent is possible, provided that the starting material is essentially soluble in the organic solvent to form a solution. What is meant by essentially soluble is that more than 50% of the starting material is soluble in amount of chosen solvent for the reaction at ambient temperature.

The third step of the method comprises mixing the solution with a base to generate the salt of the starting material, thereby forming a first reaction mixture. Any base that generates the salt of the starting material is adequate. A preferred base is sodium hydride or butyl lithium. Preferably, the solution and the base are mixed at a temperature below ambient temperature, preferably at least 0° C. if the base is sodium hydride and at least −50° C. if the base is butyl lithium. After the first reaction mixture is formed, the next step comprises adjusting the temperature of the first reaction mixture to produce a first chemical reaction. In a preferred embodiment, the first reaction mixture is heated to about 50° C. for at least four, and preferably six hours. Again, it is an object of the first chemical reaction to form a salt of the first starting material so that it can react with a second starting material.

The method next provides for adding a second starting material selected from the group consisting of dialkylhalophosphate, dialkyl(chloromethyl)phosphonate, dialkylhalothiophosphate, and diarylhalophosphate to the first reaction mixture to form a second reaction mixture. According to a preferred form of the method, the dialkylhalophosphate is dialkylchlorophosphate, the dialkylhalothiophosphate is dialkylchlorothiophosphate, and the diarylhalophosphate is diarylchlorophosphate.

Preferably, the second starting material is dissolved in a second organic solvent, which is the same as the first organic solvent, and is added dropwise to the first reaction mixture. The first reaction mixture is preferably cooled to about 0° C. before the addition of the second starting material. In a preferred embodiment, the second organic solvent is dry THF.

The next step is adjusting the temperature of the second reaction mixture to produce a second chemical reaction between the second starting material and the salt of the first starting material. According to a preferred embodiment, the second reaction mixture is heated to about 50° C. for eighteen hours.

The final step is removing the organic solvent, and any unreacted second starting material to produce a thermal runaway inhibitor. The organic solvent can be removed by any method known generally including vacuum distillation, rotary evaporation, and the like. According to one embodiment, the method further comprises washing the thermal runaway inhibitor with a third organic solvent, more preferably ether, and removing the third organic solvent by any known means. Optionally, the TRI can be purified by column chromatography using a stationary phase (silica gel or alumina) and an appropriate eluent such as chloroform and THF. The chromatographic technique is especially essential when the TRI possesses a very high boiling point or decomposes during distillation. Optionally, both the starting materials can be reacted neat or in solution in the presence of a catalyst or a base. A catalyst can be selected from nickel or palladium halide. A base can be an amine, such as pyridine and triethylamine, which can be a part of a cross-linked polymer network, e.g., basic ion-exchange resin.

Thus, upon completion of the method, thermal runaway inhibitors are produced. According to specific embodiments of the method, some examples of thermal runaway inhibitors are: diethyl(2,6-di-tert-butyl-4-methylphenyl)phosphate; diethylphosphorosuccinimidate; bis(N-succinimidyl)-ethylphosphonimide; diethylphenylthiophosphate; benzene-1,4-bis-diethylphosphate; triethanolamino-tris-diethylphosphate; diethyl-N-succinimidylphosphate; N,N'-bis(diethylphosphoro)imidazolidone; diethyl-3-pyridylphosphate; diethylphosphorodiphenylamidate, and ethylphosphorodi-N-succinimidate.

Experimental

The following examples are intended to provide those of ordinary skill in the art with a complete disclosure and description of how to make and use the novel electrolyte compositions of the invention, and are not intended to limit the scope of what the inventors regard as their invention in any way. Efforts have been made to ensure accuracy with respect to numbers used (e.g., amounts, temperatures, etc), but some experimental error and deviation should, of course, be expected. Unless indicated otherwise, parts are by weight, temperatures are in degrees Celsius, and pressure is at or near atmospheric. All chemicals, reagents, and the like, are commercially available or are otherwise readily synthesized using conventional techniques well known in the art.

EXAMPLE 1

Synthesis of diethyl(2,6-di-tert-butyl-4-methylphenyl)phosphate

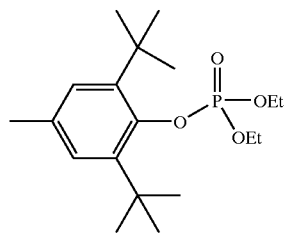

A solution of 2,6-di-tert-butyl-4-methylphenol (3 8.32 g, 0.17 mol) (Aldrich) in 100 mL of dry THF was added dropwise to a stirred suspension of sodium hydride (5.52 g, 0.23 mol) in 250 mL of dry THF at 0° C. under argon. After the addition was complete, the reaction mixture was heated at 50° C. for 6 hours. The reaction mixture was cooled to 0° C., and a solution of diethylchlorophosphate (23.77 g, 0.13 mol) in 100 mL of dry THF was added dropwise. The reaction mixture was heated further at 50° C. for 18 hours. The solvent was removed on a rotary evaporator, 300 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

EXAMPLE 2

Synthesis of diethylphosphorosuccinimidate

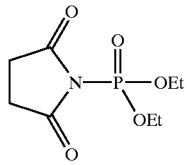

Benzyldiethyl phosphite (25.00 g, 0.11 mol)(Aldrich) was added drop by drop to a suspension of N-bromosuccinimide (17.80 g, 0.1 mol) in dry ether (150 ml) over a period of 30 min. at room temperature. After the solution had been refluxed for 6 h, it was concentrated in a rotary evaporator. The product was distilled and redistilled under reduced pressure. The final white crystalline solid product was used to prepare flame-retarding electrolyte compositions.

EXAMPLE 3

Synthesis of diethylphenylthiophosphate

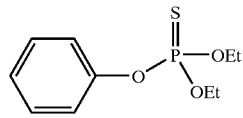

A solution of phenol (12.50 g, 0.13 mol) (Aldrich) in 100 mL of dry THF was added dropwise to a stirred suspension of sodium hydride (3.51 g, 0.15 mol) in 250 mL of dry THF at 0° C. under argon. After the addition was complete, the reaction mixture was heated at 50° C. for 6 hours. The reaction mixture was cooled to 0° C., and a solution of diethylchlorothiophosphate (24.52 g, 0.13 mol) in 100 mL of dry THF was added dropwise. The reaction mixture was heated further at 50° C. for 18 hours. The solvent was removed on a rotary evaporator, 300 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

EXAMPLE 4

Synthesis of benzene-1,4-bis-diethylphosphate

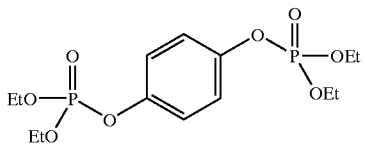

A solution of hydroquinone (15.08 g, 0.13 mol) (Aldrich) in 100 mL of dry THF was added dropwise to a stirred suspension of sodium hydride (6.73 g, 0.27 mol) in 200 mL of dry THF at 0° C. under argon. After the addition was complete, the reaction mixture was heated at 50° C. for 6 hours. The reaction mixture was cooled to 0° C., and a solution of diethylchlorophosphate (42.00 g, 0.24 mol) in 100 mL of dry THF was added dropwise. The reaction mixture was heated further at 50° C. for 18 hours. The solvent was removed on a rotary evaporator, 300 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

EXAMPLE 5

Synthesis of triethanolamino-tris-diethylphosphate

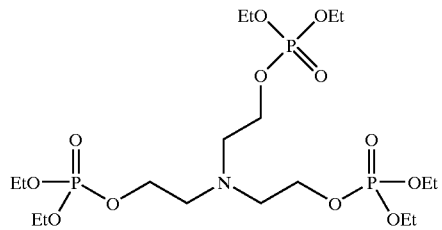

A solution oftriethanolamine (15.00 g, 0.10 mol) (Aldrich) in 150 mL of dry THF was added dropwise to a stirred suspension of sodium hydride (8.72 g, 0.35 mol) in 200 mL of dry THF at 0° C. under argon. After the addition was complete, the reaction mixture was heated at 50° C. for 6 hours. The reaction mixture was cooled to 0° C., and a solution of diethylchlorophosphate (56.01 g, 0.32 mol) in 150 mL of dry THF was added dropwise. The reaction mixture was heated further at 50° C. for 18 hours. The solvent was removed on a rotary evaporator, 300 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

EXAMPLE 6

Synthesis of diethyl-N-succinimidylphosphate

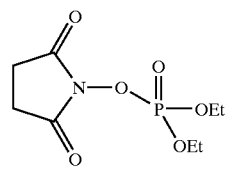

A solution ofN-hydroxysuccinimide (15.00 g, 0.13 mol) (Aldrich) in 100 mL of dry THF was added dropwise to a stirred suspension of sodium hydride (3.44 g, 0.14 mol) in 200 mL of dry THF at 0C under argon. After the addition was complete, the reaction mixture was heated at 50° C. for 6 hours. The reaction mixture was cooled to 0° C. and a solution of diethylchlorophosphate (20.71 g, 0.12 mol) in 100 mL of dry THF was added dropwise. The reaction mixture was heated further at 50° C. for 18 hours. The solvent was removed on a rotary evaporator, 300 mL diethyl etherwas added, the mixture stirred for 30 minutes, filtered, and washed again with ether. The ether was removed on a rotary evaporator. The product was purified by column chromatography (silica gel, Aldrich) using chloroform as the eluent. The liquid product was used to prepare flame-retarding electrolyte compositions.

EXAMPLE 7

Synthesis of N,N'-bis(diethylphosphoro)imidazolidone

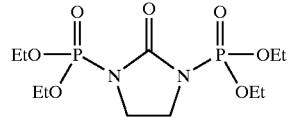

A solution of 2-imidazolidone (13.23 g, 0.15 mol) (Aldrich) in 100 mL of dry THF was added dropwise to a stirred suspension of sodium hydride (8.14 g, 0.32 mol) in 200 mL of dry THF at 0° C. under argon. After the addition was complete, the reaction mixture was heated at 50° C. for 6 hours. The reaction mixture was cooled to 0° C., and a solution of diethylchlorophosphate (48.21 g, 0.27 mol) in 100 mL of dry THF was added dropwise. The reaction mixture was heated further at 50° C. for 18 hours. The solvent was removed on arotary evaporator, 300 mL diethyl ether was added, the mixture stirred for 30 minutes, filtered, and washed again with ether. The ether was removed on a rotary evaporator. The product was purified by column chromatography (silica gel, Aldrich) using chloroform as the eluent. The liquid product was used to prepare flame-retarding electrolyte compositions.

EXAMPLE 8

Synthesis of diethyl-3-pyridylphosphate

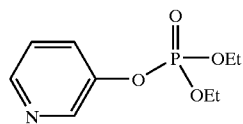

A solution of 3-hydroxypyridine (10.00 g, 0.11 mol) (Aldrich) in 100 mL of dry THF was added dropwise to a stirred suspension of sodium hydride (2.64 g, 0.11 mol) in 150 mL of dry THF at 0° C. under argon. After the addition was complete, the reaction mixture was heated at 50° C. for 6 hours. The reaction mixture was cooled to 0° C., and a solution of diethylchlorophosphate (17.26 g, 0.10 mol) in 75 mL of dry THF was added dropwise. The reaction mixture was heated further at 50° C. for 18 hours. The solvent was removed on a rotary evaporator, 200 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

EXAMPLE 9

Synthesis of diethylphosphorodiphenylamidate

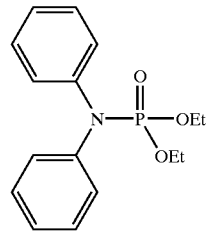

A solution of n-butyl lithium (Aldrich) in hexane (2.5 M, 23.6 mL) was added dropwise to a solution of diphenylamine (10.00 g, 0.06 mol) in 150 mL of dry THF at −70° C. under argon. After the addition was complete, the reaction mixture was allowed to come to room temperature and the mixture was heated at 50° C. for 6 hours. The reaction mixture was cooled to −70° C., and a solution of diethylchlorophosphate (10.20 g, 0.06 mol) in 100 mL of dry THF was added dropwise. The mixture was allowed to come to room temperature and heated further at 50° C. for 18 hours. The solvent was removed on a rotary evaporator, 300 mL diethyl ether was added, the mixture stirred for 30 minutes, filtered, and washed again with ether. The ether was removed on a rotary evaporator. The product was purified by column chromatography (silica gel, Aldrich) using chloroform as the eluent. The liquid product was used to prepare flame-retarding electrolyte compositions.

EXAMPLE 10

Synthesis of ethylphosphorodi-N-succinimidate

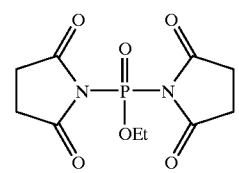

A solution of succinimide (31.65 g, 0.31 mol) (Aldrich) in 200 mL of dry THF was added dropwise to a stirred suspension of sodium hydride (9.90 g, 0.39 mol) in 150 mL of dry THF at 0° C. under argon. After the addition was complete, the reaction mixture was heated at 50° C. for 6 hours. The reaction mixture was cooled to 0° C., and a solution of diethylchlorophosphate (46.40 g, 0.26 mol) in 150 mL of dry THF was added dropwise. The reaction mixture was heated further at 50° C. for 18 hours. The solvent was removed on a rotary evaporator, 200 mL diethyl ether was added, the mixture stirred for 30 minutes, filtered, and washed again with ether. The ether was removed on a rotary evaporator. The product was purified by column chromatography (alumina, Aldrich) using ethylacetate as the eluent. The product, obtained as colorless crystals, was used to prepare flame-retarding electrolyte compositions.

EXAMPLE 11

Synthesis of 1,4-bis(diethylphosphoro)benzene

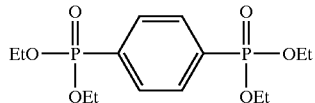

A mixture of 1,4-dibromobenzene (15.0 g, 0.064 mol) and catalytic amount of anhydrous nickel chloride (0.1 g) was heated up to 170° C. in a distillation apparatus. Triethylphosphite (22.19 g, 0.13 mol) was added dropwise maintaining the temperature at 170° C.–180° C. After the addition, the mixture was heated for 30 minutes up to 190° C. The product was purified by column chromatography (silica gel, Aldrich) using chloroform as the eluent. The liquid product was used to prepare flame-retarding electrolyte compositions.

EXAMPLE 12

Synthesis of dimethyl-bis(diethylmethylphosphonatoxy)silane

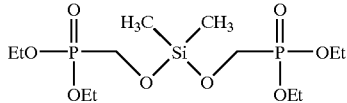

A solution of diethyl(hydroxymethyl)phosphonate (35.01 g, 0.21 mol) (Aldrich) in 150 mL of dry THF was added dropwise to a stirred suspension of sodium hydride (5.92 g, 0.23 mol) in 150 mL of dry THF at 0° C. under argon. After the addition was complete, the reaction mixture was heated at 50° C. for 6 hours. The reaction mixture was cooled to 0° C., and a solution of dimethyldichlorosilane (12.22 g, 0.1 mol) in 100 mL of dry THF was added dropwise. The reaction mixture was heated further at 50° C. for 18 hours. The solvent was removed on a rotary evaporator, 100 mL diethyl ether was added, the mixture stirred for 30 minutes, filtered, and washed again with ether. The ether was removed on a rotary evaporator. The product was distilled and redistilled under reduced pressure. The final liquid distillate was used to prepare flame-retarding electrolyte compositions.

Evaluation of the TRIs

Once the foregoing compounds were synthesized, their ability to comprise a suitable flame-retarding electrolyte was investigated. The standard reference, hereinafter referred to as the "standard electrolyte", was prepared as 1.0 M $LiPF_6$ (available commercially from Aldrich) in an EC-DMC (1:1) solvent mixture. Each TRI comprising a flame-retarding electrolyte was prepared in accord with the following composition: $LiPF_6$ (1.0 M) (Aldrich) in EC-DMC (1:1) solvent mixture containing varying amounts of the respective TRI, from about greater than 0% to about 50% by weight, more preferably from about from about 0.10% to about 15% by weight, and most preferably from about 0.50% to about 5.0% by weight. The present invention contemplates that mixtures of TRIs may be employed and may achieve further synergistic effects.

Referring to FIG. 1, the electrochemical stability of the flame-retarding electrolytes was investigated by cyclic voltammetry. Specifically, FIG. 1(a) shows the standard electrolyte; FIG. 1(b) shows that of 1.6% by weight of diethyl (2,6-di-tert-butyl-4-methylphenyl)phosphate in the standard electrolyte; and FIG. 1(c) shows that of 2.0% by weight of triethanolamino-tris-diethylphosphate in the standard electrolyte. All of the electrolytes, included those not depicted in FIG. 1, exhibited very good electrochemical stability comparable with the standard electrolyte, exhibiting an oxidative stability about 4.5 volts better than lithium. The cyclic voltammograms were obtained in a three-electrode cell under an argon atmosphere. The electrodes were glassy carbon as the working electrode, platinum as the counter electrode, and lithium as the reference electrode.

Also investigated were the conductivities of the flame-retarding electrolytes, as measured in a conductivity cell using the AC impedance method. See e.g., Lee et al., *Electrochemical and Solid-State Letters*, 3(2), 63–65 (2000); Linden, D., Ed., *Handbook of Batteries and Fuel Cells*, McGraw-Hill, NY, (1995); and Bard and Faulkner, *Electrochemical Methods: Fundamentals and Applications*, John Wiley, New York, (1980), for detailed descriptions of standard electrochemical characterization methods, such as cyclic voltammetry and AC impedance method. All flame-retarding electrolyte compositions showed ionic conductivities near that for the standard electrolyte ($3 \times 10^{-3}$ S/cm), indicating no diminution in conductivities due to the presence of a TRI in the electrochemical cell.

Figure 2:
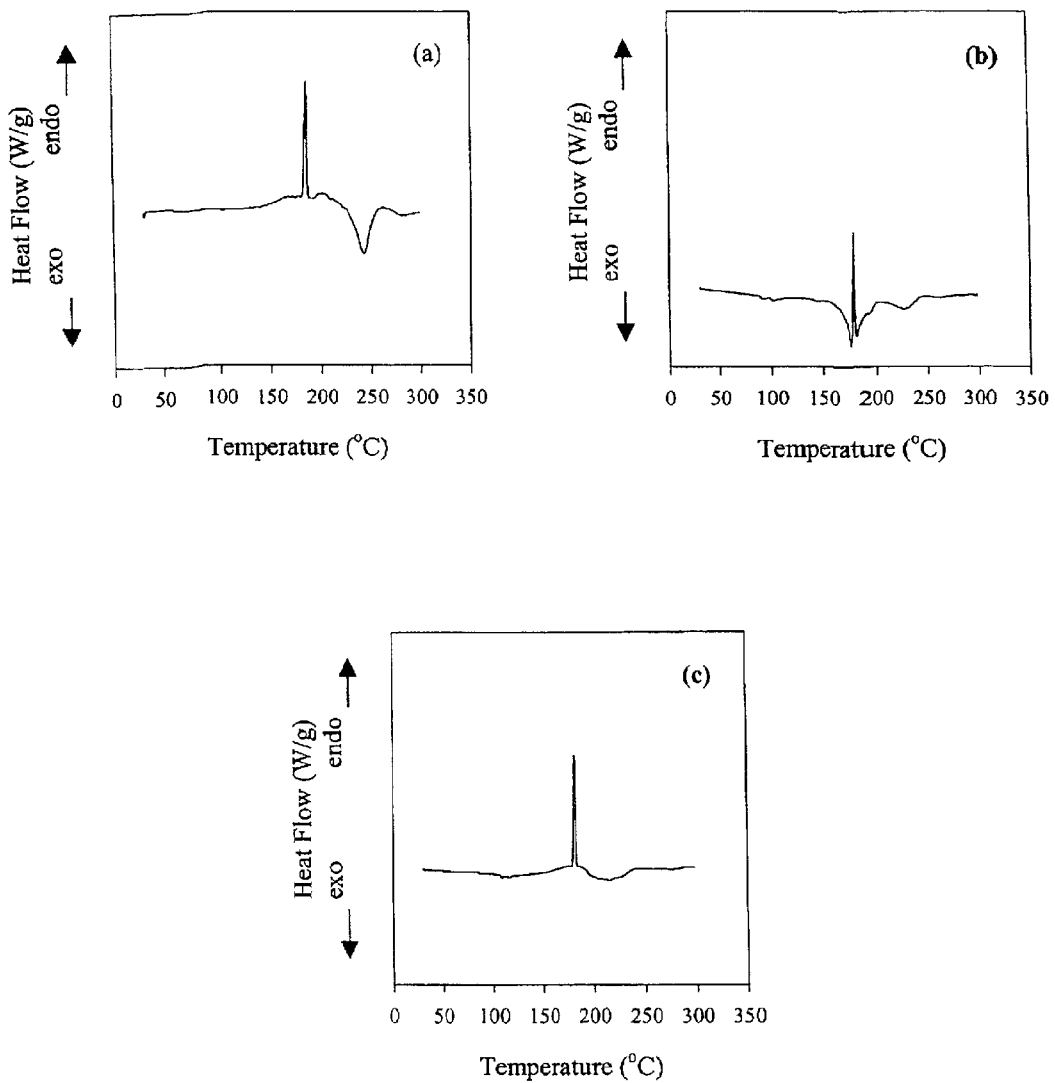
FIG. 2 shows differential scanning calorimetry traces of the standard electrolyte with and without two of the flame-retarding electrolytes.

Regarding the flammability of flame-retarding electrolytes, two different tests were employed. The first technique was differential scanning calorimetry ("DSC") in which samples of electrolytes were heated (10° C./min) with and without lithium to expose potential thermal hazards associated with the electrolyte either by itself or in contact with materials likely to be present in a cell. That is, a standard electrolyte containing a TRI and a small piece of lithium metal were sealed in a standard aluminumDSC pan. Scans were carried out at aheatingrate of 10° C./min from 30° C. to 300° C. under argon purge. The first endothermic peak at 180° C., which is present in all the tests, was assigned to the melting of lithium metal, and is shown in FIG. 2(a). The major exothermic peak, which corresponds to the reaction between lithium and electrolyte at 225° C., was very prominent for the standard electrolyte alone, but much less so for those containing flame-retarding additives, as is evidenced in FIGS. 2(b) and (c). What the DSC results demonstrate is that the addition of the flame-retardant additive significantly reduces the exothermic reactions at higher temperatures.

The second technique was accelerated rate calorimetry ("ARC"). The ARC is an adiabatic calorimeter in which heat evolved from the test sample is used to raise the sample temperature. ARC is conducted by placing a sample (in this case, an electrolyte) in a sample bomb inside an insulating jacket. In an ARC analysis, the sample is heated to a pre-selected initial temperature for a period of time to achieve thermal equilibrium. A search is then conducted to measure the rate of heat gain ("self-heating") of the sample. If the rate of self-heating is less than a preset rate after the programmed time interval (typically 0.02° C./min), the sample temperature is stopped by a new value, and the heat-wait-search sequence is repeated.

Once a self-heating rate greater than the present value is measured, the heat-wait-search sequence is abandoned; the only heating supplied to the calorimeter thereafter is that required to maintain the adiabatic condition between the sample and the jacket. Heat generated from the reaction inside the sample increases its temperature and pressure, thereby increasing the rate of the reaction. See e.g., Townsend et al. *Thermochim. Acta* 37:1 (1980). This technique provides information for thermal hazard evaluation, material handling procedures, and can provide additional information on the energies of activation, storageability, and other fundamental thermokinetic parameters that are not available using other techniques.

Figure 3:
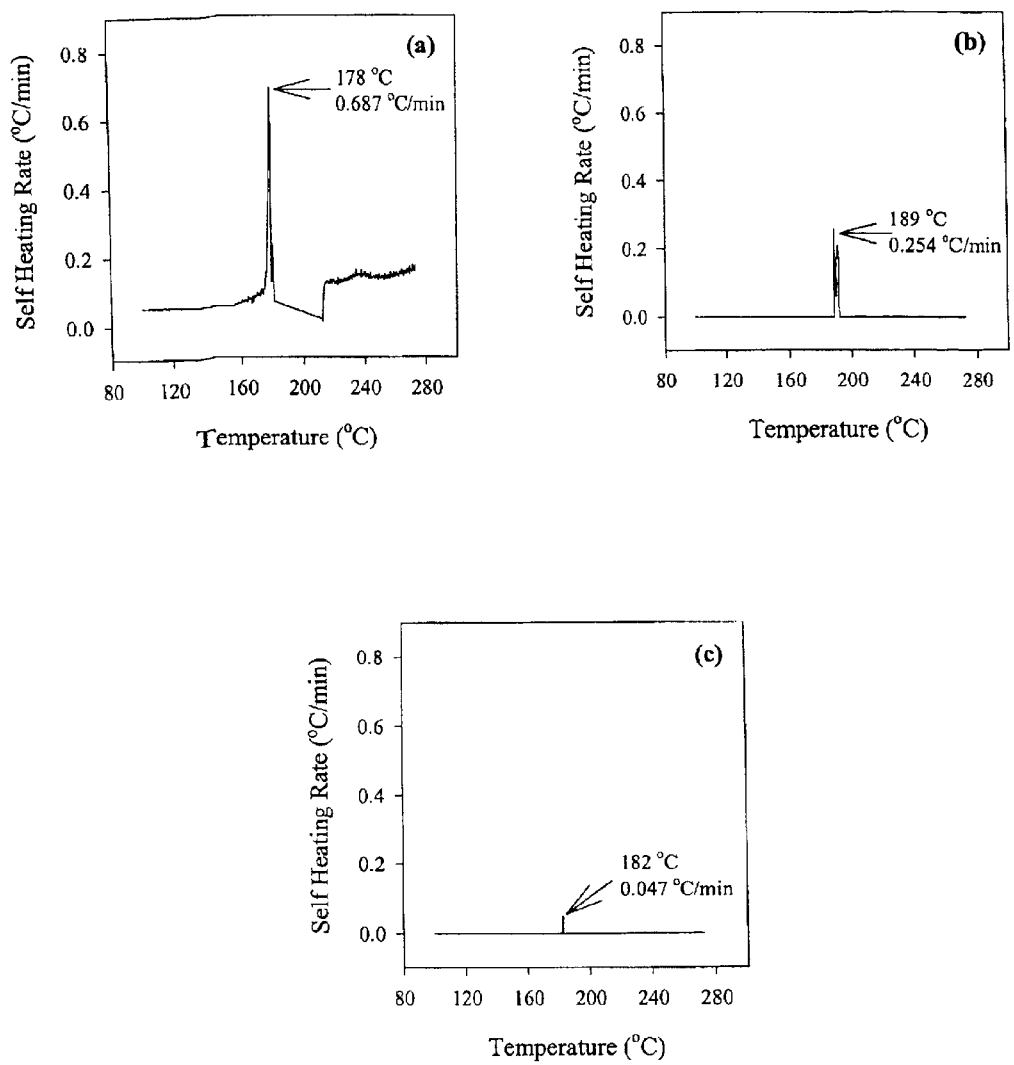
FIG. 3 shows the self-heating rate as a function of temperature in accelerated rate calorimetry experiments.

Additionally, the ARC test provides an accurate measure of thermal runaway characteristics under extreme conditions. The maximum self-heat rate of the standard electrolyte is 0.687° C./min, which occurs at 178° C., is shown if FIG. 3(a). This observation can be attributed to the reaction of lithium metal with the electrolyte. Moderate heat development was also discerned for the standard electrolyte at a higher temperature range (beginning at 215° C.) due to exothermic decomposition. Most importantly, the electrolytes containing the TRIs exhibited only one narrow and low self-heating region, as is shown in FIGS. 3(b) and (c). Specifically, the electrolyte having diethyl(2,6-di-tert-butyl-4-methylphenyl)phosphate exhibited a maximum self-heating rate of 0.254° C./min at 189° C.; the electrolyte having triethanolamino-tris-diethylphosphate exhibited a maximum self-heating rate of 0.047° C./min at 189° C.; and the electrolyte having ethylphosphorodi-N-succinimidate exhibited a maximum self-heating rate of 0.162° C./min at 200° C. Also noteworthy is a shift of the peak for the self-heating rate towards higher temperatures. These important observations distinguish these compounds as functionally superior to other reported flame-retarding additives. The reductions and shifts in self-heat rates of the TRIs significantly improve the nonflammability of current electrolyte systems without affecting existing lithium-ion battery technology.

Next investigated was the effect of the TRIs on the electrochemical performance of standard lithium coin cells known in the art as graphite/LiNi$_{0.8}$Co$_{0.2}$O$_2$, which is also referred to as type 2016. The coin cells were comprised of a cathode, an anode, a separator and an electrolyte based on the current state-of-the-art lithium-ion cells. Specifically, the cathode was 84% LiCo$_x$Ni$_{1-x}$O$_2$ (where x=0.2 or 0.8)+6% by weight acetylene black+10% by weight polyvinylidenedifluoride ("PVDF"). The anode was 89% graphite+11% by weight PVDF. The separator was polyethylene, and the electrolyte was the standard electrolyte described above or further comprising a TRI described herein.

Figure 4:
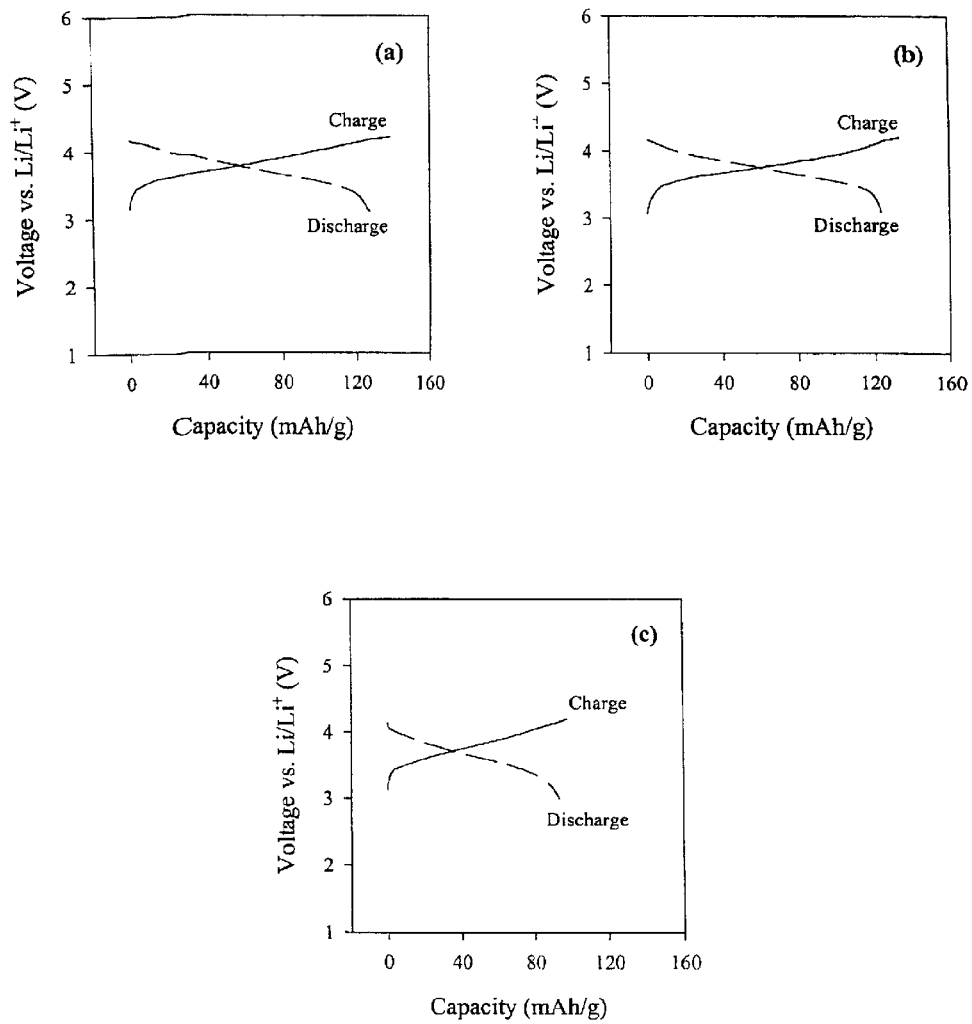
FIG. 4 shows charge-discharge behavior of lithium-ion coin cells containing the flame-retarding electrolytes of the invention.
Figure 5:
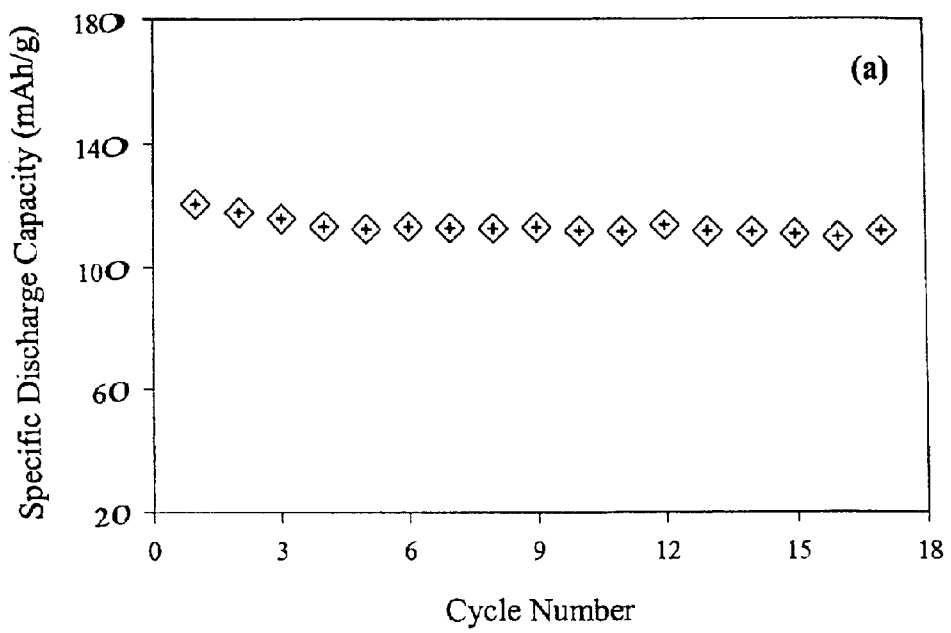
FIG. 5 shows cell cycling behavior of lithium-ion coin cells containing the flame-retarding electrolytes of the present invention.
Figure 5:
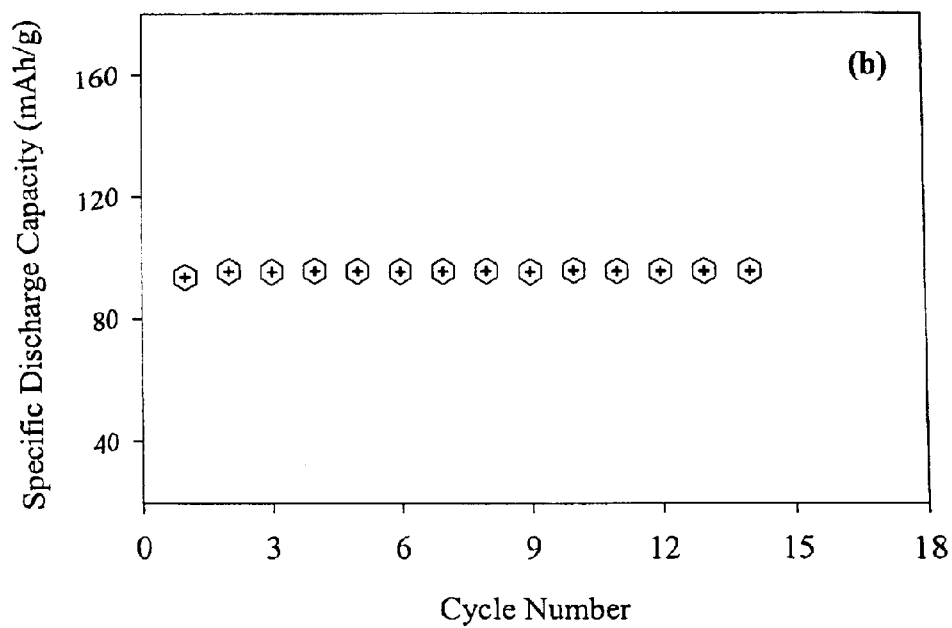

The capacity of the cells was determined under the same current regimes. The charge and discharge capacities of the cell containing TRI show an excellent performance, as shown in FIGS. 4(a)-(c). No detrimental effect of the TRI was found in the electrochemical behavior of the lithium-ion coin cells. Finally, FIG. 5 exhibits the cycling behavior of the LiNi$_{0.8}$Co$_{0.2}$O$_2$ coin cells with the electrolyte containing a TRI, which shows excellent capacity retention after 17 cycles with no detrimental effect on the cell during cycling.

The present invention contemplates that the thermal runaway inhibitors may be used in one or more electrochemical cells (such as a battery), which may or may not be operatively connected either in series or in parallel with one or more electrochemical cells, to power an apparatus. A example is where a battery system is comprised of a first battery having a compound that chemically interferes with flame propagation operatively connected to a second battery having a compound that chemically interferes with flame propagation. The compounds that chemically interfere with flame propagation may be the same in both (or more) batteries in the system, but need not be for operation. Further, because the present invention allows for much safer electrolytes to be incorporated in larger cells and batteries than previously possible, the list of equipment and devices that could employ the invention comprise EVs, automobiles, motorcycles, motor homes, trucks, boats, or any apparatus that is motor-driven. The present invention may also be used in smaller electronic components such as, but not limited to, computers, cellular telephones, and the like.

While the specific embodiments have been illustrated and described, numerous modifications come to mind without significantly departing from the spirit of the invention and the scope of protection is only limited by the scope of the accompanying claims.

We claim:

1. A battery comprising:

an anode;

a cathode; and an electrolyte having conductivity greater than about 10$^{-3}$ S/cm at ambient temperature and which includes a compound that chemically interferes with flame propagation;

wherein the compound that chemically interferes with flame propagation comprises a compound having the general structure:

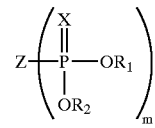

wherein X is oxygen;
wherein R$_1$ is a C$_1$ to C$_{12}$ alkyl moiety that is terminally substituted with zero to three halogen atoms;
wherein R$_2$ is a C$_1$ to C$_{12}$ alkyl moiety that is terminally substituted with zero to three halogen atoms;
wherein Z is an oxy derivative of an aryl moiety;
wherein m is an integer from 1 to 4; and
wherein the compound that chemically interferes with flame propagation is selected from the group consisting of: diethyl(2,6-di-tert-butyl-4-methylphenyl) phosphate and benzene-1,4-bis-diethylphosphate.

2. A method of producing a battery according to claim 1, wherein the compound that chemically interferes with flame propagation is produced by a process comprising the steps of:

providing a first starting material comprising 2,6-di-tert-butyl-4-methylphenol;

mixing the starting material with a sufficient amount of an organic solvent in which the starting material is essentially soluble to form a solution;

mixing the solution with a base to form a first reaction mixture;

adjusting the temperature of the first reaction mixture to produce a first chemical reaction;

adding a second starting material comprising a dialkylhalophosphate to the first reaction mixture to form a second reaction mixture;

adjusting the temperature of the second reaction mixture to produce a second chemical reaction;

removing the organic solvent to produce a thermal runaway inhibitor
wherein the thermal runaway inhibitor is diethyl(2,6-di-tert-butyl-4-methylphenyl)phosphate.

* * * * *